April 16, 1929. H. A. McGUNNIGLE 1,709,626
APPARATUS FOR ALTERING THE SHAPE AND SIZE OF A PROJECTED BEAM OF LIGHT
Filed April 21, 1926
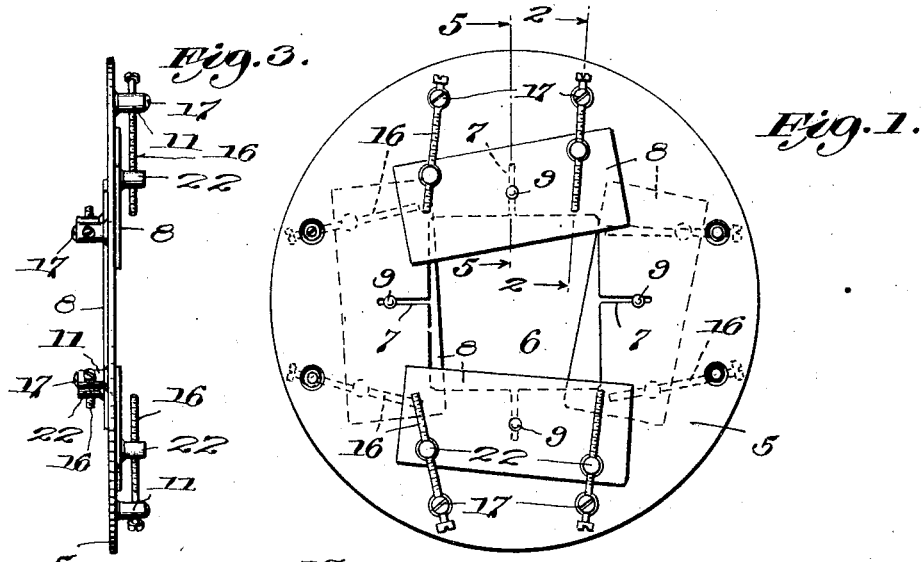
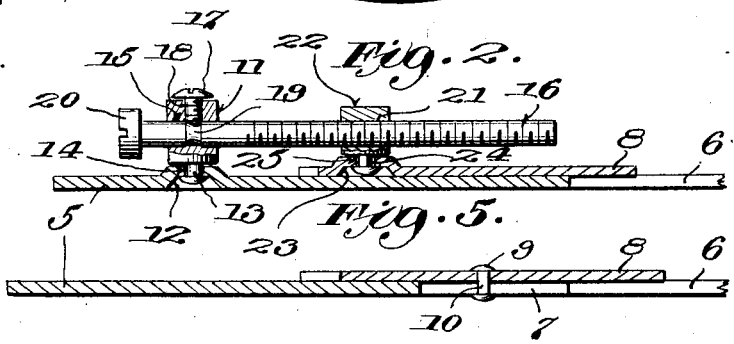
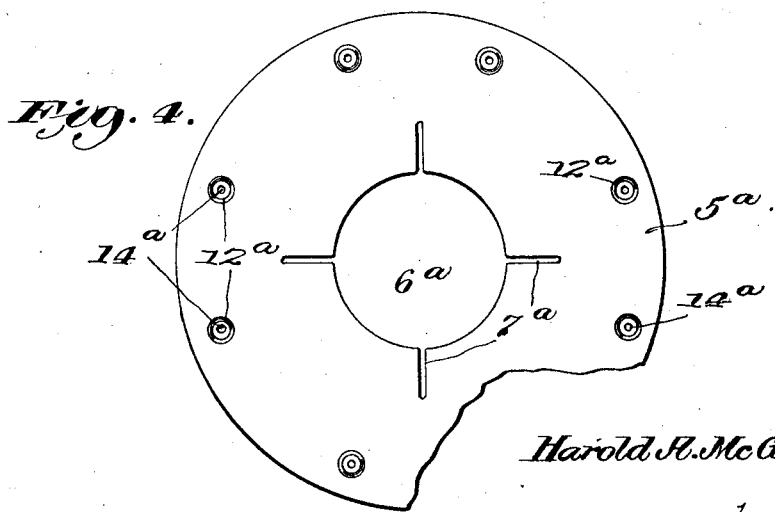
Inventor
Harold H. McGunnigle
By Clair M. Whitman
Attorney Patented Apr. 16, 1929.

1,709,626

UNITED STATES PATENT OFFICE.

HAROLD A. McGUNNIGLE, OF NEW YORK, N. Y., ASSIGNOR TO ARTLITE, INC., OF NEW YORK, N. Y., A CORPORATION OF NEW YORK.

APPARATUS FOR ALTERING THE SHAPE AND SIZE OF A PROJECTED BEAM OF LIGHT.

Application filed April 21, 1926. Serial No. 103,547.

This invention relates to an apparatus for use with light projection machines and is particularly adapted to be used in an optical projection machine of the type designed for illuminating a field of vision or an object from a distance with a projected beam of light.

The primary object of the invention is to control the area of illumination of a projected beam of light by altering the size or shape of the beam at the projector.

Another important object of the invention is to intercept or modify peripheral portions of a beam of light and to alter the area of such portions.

A further object is to control the shape of a beam of light projected on a field of vision at an angle to its plane in such manner as to illuminate an area of any desired shape or size on said field.

Another object is to control a beam of light projected on a field of vision at an angle to the plane of the field in such manner as to project a beam having a rhomboidal section.

Another object is to provide a means having a central opening through which a beam of light may be projected and including one or more adjustable light shields movable into and out of the beam adjacent said opening.

And another object of the invention is to provide a means having a central rectangular opening through which a pyramidal beam of light may be projected and including adjustable light shields movable to intersect said opening and angularly adjustable with respect to the side walls of said opening.

Other objects of the present invention will appear in the following description thereof, reference being had to the accompanying drawing forming part of this specification, wherein like reference characters indicate corresponding parts in the several views and in which:—

Figure 1 is a front elevation of a preferred embodiment of the invention;

Figure 2 is a sectional elevation, on an enlarged scale, of the light shield adjusting means, taken on the line 2—2, Figure 1, and showing the mounting of one of the adjusting screws;

Figure 3 is a side elevation of the apparatus in assembled relation;

Figure 4 is a front elevation of a modified form of the supporting disk for the light shields; and Figure 5 is a section taken on the line 5—5 of Figure 1.

Referring more particularly to the drawing, the apparatus comprises a support such as the plate or disk 5 having a central opening 6 therein of any desired shape, preferably square, as shown in Figure 1, or round, as shown in Figure 4. The disk is mounted in the light projection machine in position to permit the beam of light to pass through the said opening at right angles to the plane of the disk. This disk may be mounted in the machine in any desired manner depending upon the particular type of projection machine used. One preferred method is shown and described in my copending application, Serial No. 103,546, filed April 21, 1926, which consists in locating the disk between the condensing and projecting lens and attaching it to a ring rotatably mounted on an annular support carried by the lamp housing of the projector unit. For a detailed disclosure of this method of mounting the present invention in an optical projection machine, reference may be had to the above-noted application.

The disk 5 is also provided with guide slots 7 extending outwardly from the center of each side wall facing the opening 6 and at right angles thereto. The disk supports two pairs of light shields 8, each shield consisting of a plate, preferably rectangular and opaque, mounted for combined rotary and lateral movement in sliding contact with the disk by virtue of the headed pin or rivet 9 secured to the center of the shield and arranged to project beyond one face of the same with its shank 10 slidable and rotatable in the slot 7. The width of the plate and the length of the slot are so proportioned as to permit the retraction of each shield back to that side of the opening which it faces. As stated above, the light shields are arranged in pairs, one pair being located on one face of the disk 5 adjacent opposed sides of the opening 6 and the other pair being positioned on the other face of the disk adjacent the other opposed sides of the opening. This arrangement is clearly indicated in Figure 1 and is such as to permit the manipulation of any or all of the shields without obstruction from the others.

The adjusting means for moving each shield 8 to any desired position over the opening 6 (within the limits of movement of the rivet 9 in its slot 7) is more clearly shown in Figure 2, and, in its preferred form, comprises a fixed swivelled post 11 mounted in an upright position on an upset portion 12 of the disk 5 near the periphery thereof. The post 11 is formed with a depending stem 13 extending through and rotatable in the opening 14 in the portion 12, the end of the stem being swaged or headed over in the recess on the under side of the disk. This construction retains the post in position for swivelling on the raised portion of the disk. The post is also provided with a lateral bore 15 adapted to slidably receive the unthreaded portion of the adjusting screw 16. The screw 16 is held in position for rotary movement only in the bore 15 by the set screw 17 threaded in an axial opening 18 in the post and projecting into the annular groove 19 formed in the screw adjacent its head 20. The adjusting screw 16 extends substantially parallel to the disk 5 and shield 8 and is threaded in the tapped hole 21 of the swivelled traveller post 22 mounted on the upset portion 23 of the shield 8. The mounting of the post 22 is similar to that of the fixed post 11, as by the stem 24 extending through the hole 25 in the shield with its end swaged or headed over in the recess on the opposite side of the shield, as shown.

The movement of each light shield is controlled by two adjusting screws 16 each mounted in a fixed post 11 and a traveller post 22 on opposite sides of the guide rivet 9, the post 22 being located near a rear corner of the shield.

With the construction described the swivelled posts will adjust themselves to prevent binding of the screws when any one of the pairs of adjusting screws 16 is turned so as to cause rotation of its shield. Each shield 8 may be moved bodily over the opening 6 by turning both of its screws the same amount in the same direction, and this movement can be made as small as desired. To rotate the shield about its pivot 9, one of the screws may be turned in the proper direction or both screws turned in opposite directions. Thus the light shields may be adjusted to various angular positions over the opening 6 in the manner indicated in Figure 1.

In Figure 3, a side elevation of the apparatus is shown to more clearly illustrate the relative locations of two adjacent light shields on opposite sides of the disk 5, certain of the adjusting screws 16 and swivelled posts 11 and 22 being shown in operative position on each shield.

In Figure 4 is shown an elevation of a modified form of support or disk $5^a$ having a round central opening $6^a$, spaced guide slots $7^a$ and the mounting holes $14^a$ in the upset portions $12^a$; it being understood, of course, that this form of disk may be substituted as a support for the light shields and adjusting means shown in the other figures.

In operation, the support or disk 5 is mounted in operative position in a light projecting machine (not shown, but preferably of the type shown and described in my copending application above referred to) with the beam of light projected through the opening 6 normal to the plane of the disk. The size and shape of the beam may be altered by adjustment of the light shields 8 into and out of the peripheral portions thereof, the movement of the individual shields being accurately controlled by turning the adjusting screws 16 in the fixed posts 11 swivelled to the disk, and thus causing the traveller posts 22 to be moved axially along the screws and the shields to be drawn bodily over or rotated on the face of the disk. When once adjusted in this manner the shields will remain in adjusted position without clamping screws or other securing means. It will also be noted that the shields are adjustable from the edge of the disk either with a screwdriver or the fingers, such adjustment being necessary when the apparatus is mounted in the limited space between the condensing lens and the projection lens of an optical projection machine.

A light projection machine when equipped with an adjustable light shield of the type described is useful for many practical purposes, being particularly effective for illuminating a field of vision or object having a specified outline or area. For example, the light of the machine may be adjusted to illuminate a framed picture or painting within its frame, the projector being mounted in an inconspicuous location on a wall or ceiling above and to one side of the line of sight. Very pleasing effects are produced in this manner because the frame and surrounding objects are not illuminated while the picture or painting itself is uniformly lighted and prominently displayed. Similarly, an advertising sign, exhibit or other object or objects may be uniformly and effectively illuminated. Furthermore, such illumination is very economical since a single source of light of small candlepower may be utilized to illuminate comparatively large areas with sufficient intensity to give effective results.

In the illumination of many objects it is desirable to place the projection machine in an inconspicuous location at a distance from the object as on a side wall, bookcase or other support with the result that the beam of light strikes the object at an angle above the line of sight. If the beam is projected through a rectangular or round opening it will illuminate an area on the field of vision which will be irregular or distorted. This distortion will vary, of course, with the angle of projection and it is the purpose of the present invention to distort or alter the cross-section of the beam itself near the source of light by means of the adjustable shields to such an extent as will correct the distortion of the illuminated field and for any angle of projection, thus ensuring the desired illumination of the object.

While a particular embodiment of the invention has been shown and described it is to be understood that various changes may be made without departing from the spirit of the invention and within the scope of the appended claims.

Having described the invention what I claim as new and desire to secure by Letters Patent, is—

1. In a device of the class described, a supporting disk having a central square opening, a plurality of guide means extending outwardly from the sides of said disk adjacent said opening, a plurality of rectangular light shields pivotally mounted on said guide means, a pair of posts swivelled on upset portions of each shield on opposite sides of said pivotal mounting, apertured posts swivelled on upset portions of said disk adjacent its periphery, an adjusting screw rotatably mounted in each apertured post, means for preventing axial movement of the screw in the last-named post, and means for threadedly engaging said screw in the corresponding post on each shield whereby to impart movement to the shield upon rotation of either of its adjusting screws.

2. In a device of the class described, a supporting member having an opening, guide means extending outwardly from the sides of said member adjacent said opening, rectangular light shields pivotally mounted on said guide means, posts swivelled on offset portions of each shield on opposite sides of said pivotal mounting, other posts swivelled on the offset portions of said supporting member adjacent its edges, and means extending between the complemental of the said posts for adjusting said shields relative to the opening in said supporting member.

In testimony whereof I affix my signature.

HAROLD A. McGUNNIGLE.